United States Patent [19]

Carpenter

[11] 4,176,916
[45] Dec. 4, 1979

[54] CAM FILTER WHEEL

[75] Inventor: Frank M. Carpenter, Rockford, Ill.

[73] Assignee: Neotec Corporation, Silver Spring, Md.

[21] Appl. No.: 777,052

[22] Filed: Mar. 14, 1977

[51] Int. Cl.² .............................................. G02B 5/22
[52] U.S. Cl. ................................... 350/315; 350/164; 350/318; 356/418
[58] Field of Search ................ 350/315, 318; 356/186, 356/188, 190, 416–420; 250/339; 74/567, 569

[56] References Cited

U.S. PATENT DOCUMENTS

| | | | |
|---|---|---|---|
| 2,988,932 | 6/1961 | Swanson | 74/567 X |
| 3,105,215 | 9/1963 | Seibold | 74/567 X |
| 3,765,775 | 10/1973 | Ganssle et al. | 356/188 |
| 3,776,642 | 12/1973 | Anson et al. | 356/188 |
| 3,861,788 | 1/1975 | Webster | 356/188 X |
| 3,877,818 | 4/1975 | Button et al. | 356/186 |
| 4,017,191 | 4/1977 | Bunge | 356/188 |
| 4,082,464 | 4/1978 | Johnson, Jr. | 350/315 X |
| 4,084,909 | 4/1978 | Mathisen | 350/315 X |

*Primary Examiner*—John K. Corbin
*Assistant Examiner*—John D. Lee
*Attorney, Agent, or Firm*—Lane, Aitken & Ziems

[57] ABSTRACT

A cam filter wheel apparatus is disclosed for tilting interference filters in order to achieve variation in the light wavelength transmitted by each filter. The wheel apparatus contains a number of filters each mounted so as to pivot and change its inclination with respect to an incident light beam as the filter wheel rotates each filter through the light path. The pivot motion is achieved by a cam follower associated with each filter which rides on a stationary cam track.

6 Claims, 2 Drawing Figures

CAM FILTER WHEEL

BACKGROUND OF THE INVENTION

The present invention relates generally to the field of instruments for measuring and analyzing the optical properties of organic materials and, more particularly, to improved optical systems for measuring and analyzing optical densities of organic materials at various wavelengths to determine the percentage of certain constituents contained in the test material.

During the past few years there has been an increasing demand by the agricultural community for versatile test instruments capable of rapidly determining moisture, oil and protein content in produce, grain and other agricultural products. The traditional analytical laboratory techniques, such as the Kjeldahl technique for measuring protein, are extremely accurate but require the services of a skilled chemist. The results, furthermore, are not immediately or readily available. Buyers of agricultural products have demonstrated an increasing interest in accurate and rapid determination of moisture, protein and oil percentages of the various products purchased. The wheat export market, for example, has seen the widespread introduction of selling on the basis of guaranteed protein content. This competitive pressure has increased the requirement for the commodity handler, from the country elevator to the export terminal, to rapidly and accurately sort grains and other products by their protein percentages, as well as by oil and water content, where applicable. The need for versatile, yet low cost, advanced equipment, which combines and improves upon recent scientific findings in the field of non-destructive testing of agricultural products has greatly increased. For the maximum usefulness of commodity handlers, such an instrument must not place high demands on the skillfulness of the operator or require a specialized knowledge of the scientific basis for the end result.

Recent developments have provided instruments which are able to satisfy some of the above requirements of commodity handlers. The optical analyzer described by Eugene R. Ganssle and Donald R. Webster in U.S. Pat. No. 3,765,775, assigned to the assignee of the present application, provides an optical system for measuring the optical density of an object such as a grain sample which is illuminated with light of different wavelengths in a continuous sequence. The specimen sample is illuminated with light sequentially filtered by a continuously rotating disc carrying a plurality of narrow band optical interference filters. The combined output of several photodetectors positioned to receive light transmitted through, or, alternatively, reflected by the specimens is selectively sampled after passing through a logarithmic amplifier to obtain readings at two discrete wavelengths which are then compared in a differential amplifier to provide the required measurements. Although the system described in U.S. Pat. No. 3,765,775 is satisfactory for its intended purpose, its ability to make readings at various wavelengths is naturally limited by the number of filters carried by the rotating disc. It is, therefore, not possible to take readings at wavelengths between those of two adjacent filters.

The disadvantages of the above described system have been mitigated in a more recent optical analyzer described by Donald R. Webster in U.S. Pat. No. 3,861,788, also assigned to the assignee of the present application. The instrument described therein provides an automatic test apparatus for gauging the percentage of various constituents in organic substances by comparing the reflective optical density of the sample at various wavelengths. This device contains narrow band optical filters connected together in the form of a rotatable paddlewheel positioned so that the filters can be individually swept through the incident light path between the specimen and a wide band light source. As the filter wheel turns, the band of light passed by each filter is progressively shifted with the changing angle of the filter relative to the light path. The paddlewheel filter configuration includes opaque vanes extending from the ends of the filters to peiodically interrupt the passage of light to the specimen. Photodetectors are positioned to sense the level of light reflected from the specimen. The output of the photodetectors is sampled at predetermined times relative to the rotation of the filter wheel to yield values indicative of the reflected intensity at certain wavelengths. An electronic circuit utilizes this data to calculate three optical density difference values corresponding to moisture, protein and oil contents of the specimen sample. The difference values are automatically inserted in three linear equations which are solved to obtain readings representing the three percentages of oil, water and protein content of the specimen. Each time a new specimen is loaded for testing, the instrument is automatically calibrated against a standard sample, preferably Teflon (trademark). The output of the photodetectors is sampled in a special circuit which subtracts the level of dark period current from the output when the photodetectors are illuminated.

Yet another recent prior art photo-optical technique for determining, for example, the fat content of meat is described by George F. Button and Carl H. Norris in U.S. Pat. No. 3,877,818, owned by the United States of America. This technique, developed at the U.S.D.A. Agricultural Research Service in Greenbelt, Maryland, utilizes an instrument wherein a meat sample is exposed to infrared radiation from an incandescent light source. The radiation is transmitted through or reflected from the meat sample onto a tilting mirror which causes the respective transmitted or reflected light from the meat to pass through a planar interference filter at varying angles of incidence. Varying the angle of incidence of the filter by oscillating the tilting mirror produces a corresponding change in the wavelength of the radiation passing through the filter over a narrow bandwidth in the infrared spectrum. A photodetector receives the light transmitted through the filter and generates an electrical signal that is processed to read the fat content of the sample.

The present invention improves upon these and other prior art optical analyzers by providing a novel apparatus for tilting a set of interference filters in order to achieve greater variations in the wavelength of light transmitted through each filter.

SUMMARY OF THE INVENTION

The present invention provides a unique and novel cam filter wheel system for tilting interference filters in order to achieve variations in the light wavelength transmitted by each filter. The cam filter wheel is to be used in place of the paddlewheel-shaped filter wheel in the system described in the aforementioned U.S. Pat.

No. 3,861,788, which is hereby incorporated by reference.

A number of narrow bandwidth optical interference filters are pivotally mounted on a filter wheel which is driven at a constant speed by a motor. A cam follower is attached to each filter and rides upon a stationary, circular cam track extending around the perimeter of the wheel. As each cam follower passes over a rise in the cam track, each respective filter is caused to pivot and change its inclination with respect to a path of the light incident upon the filter. The light is typically illuminated from a wide band source such as a white light from an incandescent tungsten filament bulb. Thus, as each filter swings into the light path, it is caused to go through a pivoting motion which provides a variation in the tilt of the filter with respect to the light path and thereby causes a variation or sweeping of the light wavelength transmitted by the filter.

The present cam filter wheel invention greatly improves upon the prior art interference filter constructions in many important respects. The initial tilt angle, for example, can be adjusted to any predetermined value for a particular application. A greater variation in tilt angle, and, therefore, corresponding wavelength variation is possible since all angles between 0 and 45° are possible. Also, any number of filters can be utilized in the present invention. It is also, furthermore, possible to shape the cam track to compensate for the nonlinearity of the wavelength shift versus the tilt angle. In addition, the shorter optical path of the present invention results in a lower F-number thereby resulting in greater light energy passing through this system.

DETAILED DESCRIPTION OF THE INVENTION

Figure 1:
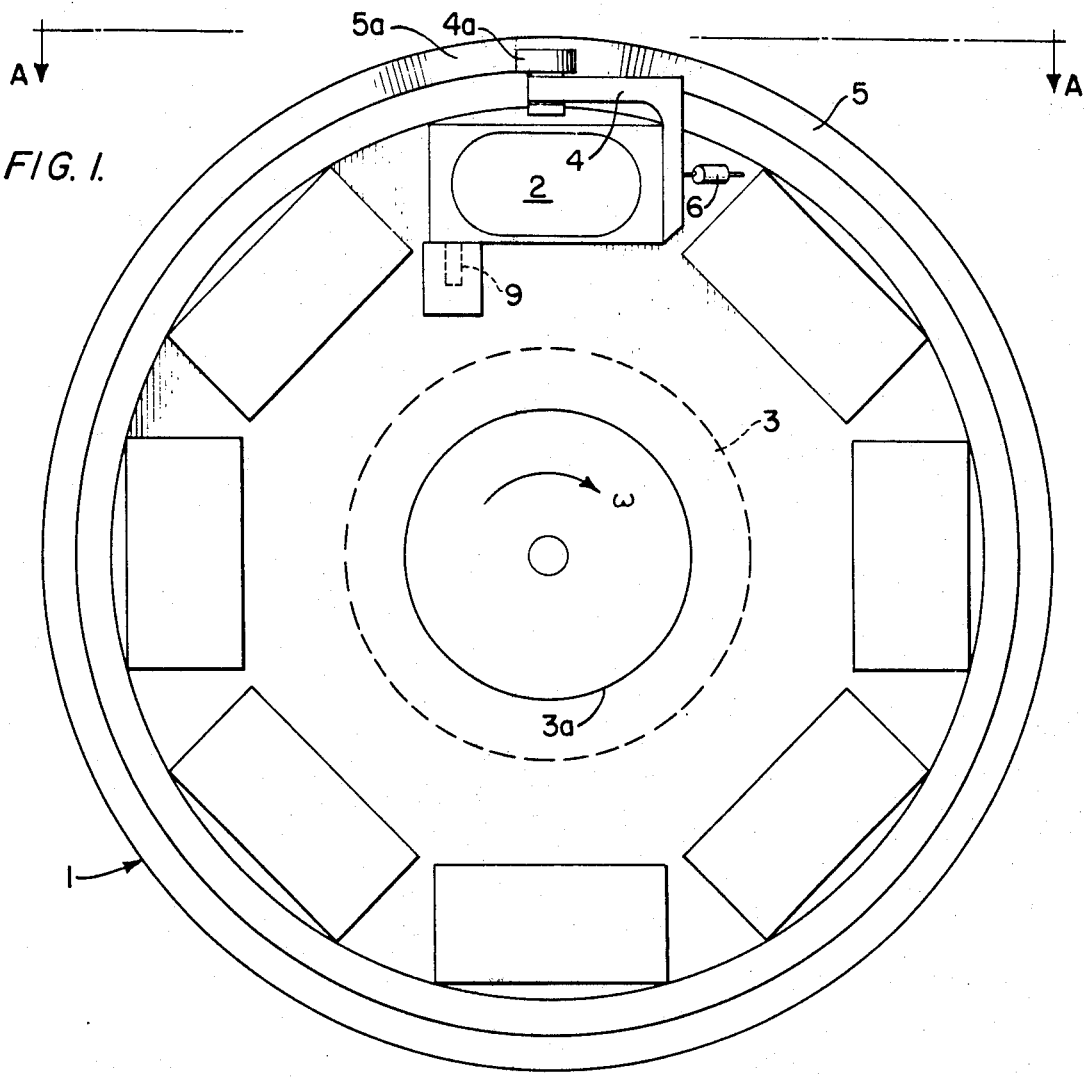
FIG. 1 is a schematic diagram illustrating a top view of the present cam filter wheel invention.

A top view of the cam filter wheel forming the present invention is illustrated in FIG. 1. An optical filter wheel 1 having a number of narrow bandwidth interference filters mounted thereon is provided with a constant drive motor 3 having a tachometer 3a to cause the filter wheel 1 to rotate at a constant speed of angular velocity $\omega$. For convenience, the mounting of one interference filter 2 is shown in FIG. 1, although it should be clearly understood that all the other filters are similarly mounted.

Figure 2:
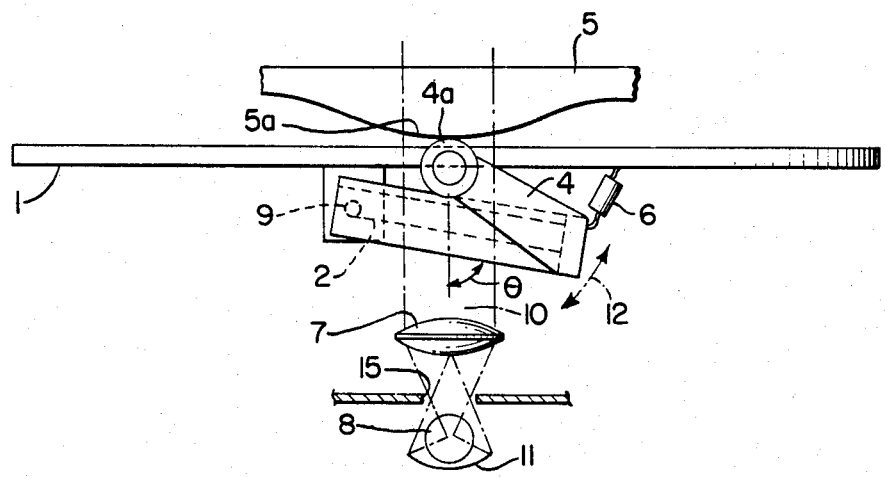
FIG. 2 is an end view along lines A—A of FIG. 1 and further illustrates the light source and input optics of the present invention.

The interference filter 2 is pivotally mounted on the filter wheel 1 by means of pin 9, shown in FIG. 2 (which is an end view along line A—A of FIG. 1), about which the filter can rotate. A cam follower 4 is attached to each filter 2 at one end, the opposite end of the cam follower 4 having a rotating wheel 4a which rides up a stationary, circular cam track 5 extending around the perimeter of the filter wheel 1. The interference filter 2 is biased by tension device 6 (FIG. 2) so that the wheel 4a of cam follower 4 is always in frictional contact with the cam track 5.

As wheel 4a of each cam follower 4 passes over a rise 5a in the cam track 5, the interference filter 2 associated with the cam follower 4 will pivot about its pin 9 and thereby change its inclination with respect to the path of light 10 from source 8. The light source 8 shown in FIG. 2 is typically a wide band source such as an incandescent bulb emanating white light. A reflector 11 is commonly positioned behind the bulb 8 so that the intensity of the source is projected in the direction shown through an aperture 15 and focused by lens 7 on the interference filter which has moved across light path 10 by the rotational movement of filter wheel 1. An aperture (not shown) is provided in the wheel beneath each interference filter to permit passage of the light beam to irradiate a sample to be analyzed.

As each interference filter 2 swings into the light path 10, the rise 5a in the cam track 5 causes the filter 4 to pivot in a direction generally shown by arrow 12. This pivoting motion provides a variation in the tilt of the filter with respect to the light path 10 (shown by variable angle $\theta$). Since angle $\theta$ varies in accordance with the tilt of the interference filter 2, there is a corresponding variation in the light wavelength transmitted through interference filter 2. The light passed by the filter 2 at each of its continuous inclinations through its pivot motion irradiates a sample specimen (not shown) which will either transmit or reflect this radiation. A photodetector (also not shown) will then sense the radiation transmitted through or reflected by the sample and together with such other electronic apparatus as described, for example, in the aforementioned U.S. Pat. No. 3,861,788, will measure the percentages of the various pertinent constituents in the sample.

The present invention thus greatly improves upon the prior art interference filter constructions by permitting the initial filter tilt angle $\theta$ to be adjusted to any predetermined value. Further, the present construction provides a greater variation in tilt angle $\theta$, since all angles between 0° and 45° are possible, depending upon the construction of rise 5a of cam track 5. Also, any number of filters 2 as can be accommodated by the filter wheel 1 can be utilized. In addition, it is possible to shape cam track 5 to compensate for the nonlinearity of the wavelength shift of radiation transmitted by each filter 2 versus its tilt angle $\theta$. Finally, the shorter optical path made possible by the present construction increases the F-number of the optical system, thereby resulting in greater light energy passing through each filter 2 for projection on the sample and detection by the photodetector for spectral analysis.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Optical apparatus for continuously varying the bandwidth of light illuminating an object, comprising a source of wide band light for illuminating an object, a filter wheel assembly having a plurality of narrow bandwidth optical interference filters mounted on said wheel assembly, means to rotate said filter wheel about its axis, said interference filters being pivotally mounted on said wheel and positioned relative to the light path defined between said light source and the object such that said filters are swept through said light path individually during rotation of said wheel, means to cause said filters to pivot with respect to said wheel assembly as they are each swept through said light path so as to change their inclination with respect to said light path, whereby the wavelength of the light passing through each of said pivoting filters is varied in accordance with the variation of said inclination of the pivoting filters, said means to cause said filters to pivot comprising a cam track and a cam follower attached to each filter and riding upon said cam track as said filter wheel assembly sweeps each filter through said light path.

2. The apparatus of claim 1, wherein said cam track is stationary, circular and coaxial with the axis of said filter wheel assembly and each said cam follower rides on said track continuously as said filter wheel assembly rotates.

3. The apparatus of claim 2, wherein said cam track is provided with a rise to be engaged by each cam follower as the corresponding interference filter is swept into said light beam.

4. The apparatus of claim 3, wherein said interference filter pivots through an angle of approximately 45 degrees as the filter is swept through said light path.

5. The apparatus of claim 3, wherein the cam track is shaped so as to compensate for any nonlinearity of the wavelength variation of the light transmitted by said filter versus the interference filter inclination as the latter is pivoted across the light path.

6. Optical apparatus for continuously varying the bandwidth of light illuminating an object, comprising a source of wide band light for illuminating an object, a filter wheel assembly having a plurality of narrow bandwidth optical interference filters mounted on said wheel assembly, means to rotate said filter wheel about its axis, said interference filters being pivotally mounted on said wheel and positioned relative to the light path defined between said light source and the object such that said filters are swept through said light path individually during rotation of said wheel, means to cause said filters to pivot with respect to said wheel assembly as they are each swept through said light path so as to change their inclination with respect to said light path, whereby the wavelength of the light passing through each of said pivoting filters is varied in accordance with the variation of said inclination of the pivoting filters, the initial inclination of said interference filters with respect to said light path being adjustable to any angle.

* * * * *